March 15, 1966  E. A. MEYER  3,239,988
AUTOMOBILE TRIM ASSEMBLY
Filed Jan. 15, 1964  4 Sheets-Sheet 1
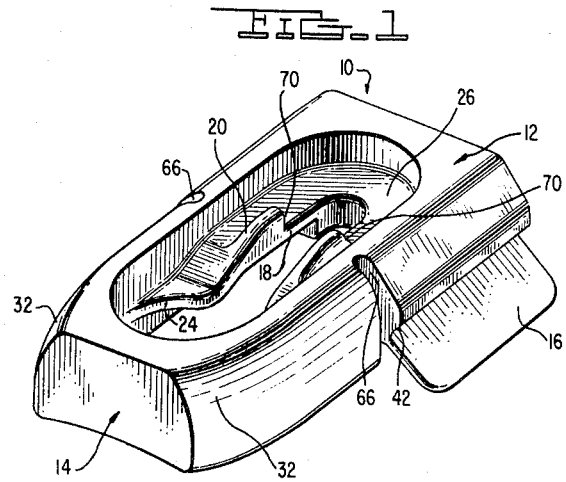
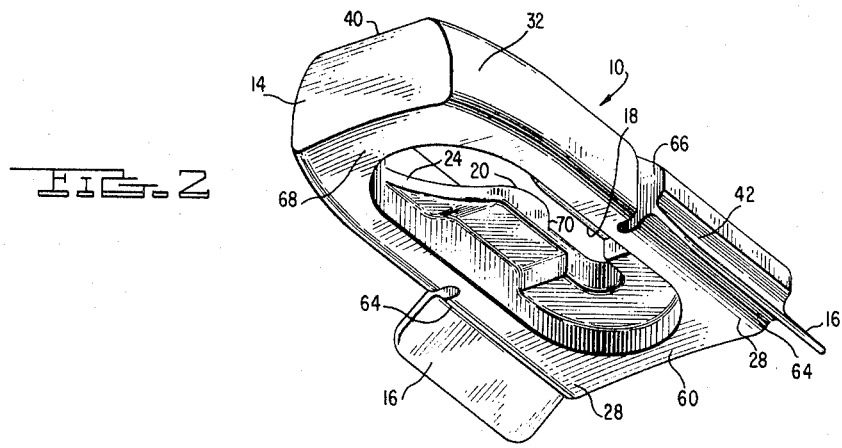
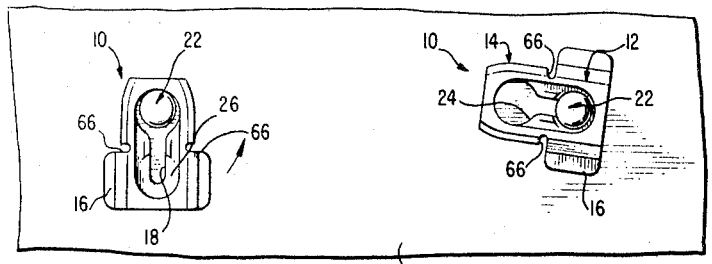
INVENTOR.
ENGELBERT A. MEYER
BY
*Burton & Parker*
ATTORNEYS March 15, 1966  E. A. MEYER  3,239,988
AUTOMOBILE TRIM ASSEMBLY
Filed Jan. 15, 1964
4 Sheets-Sheet 2
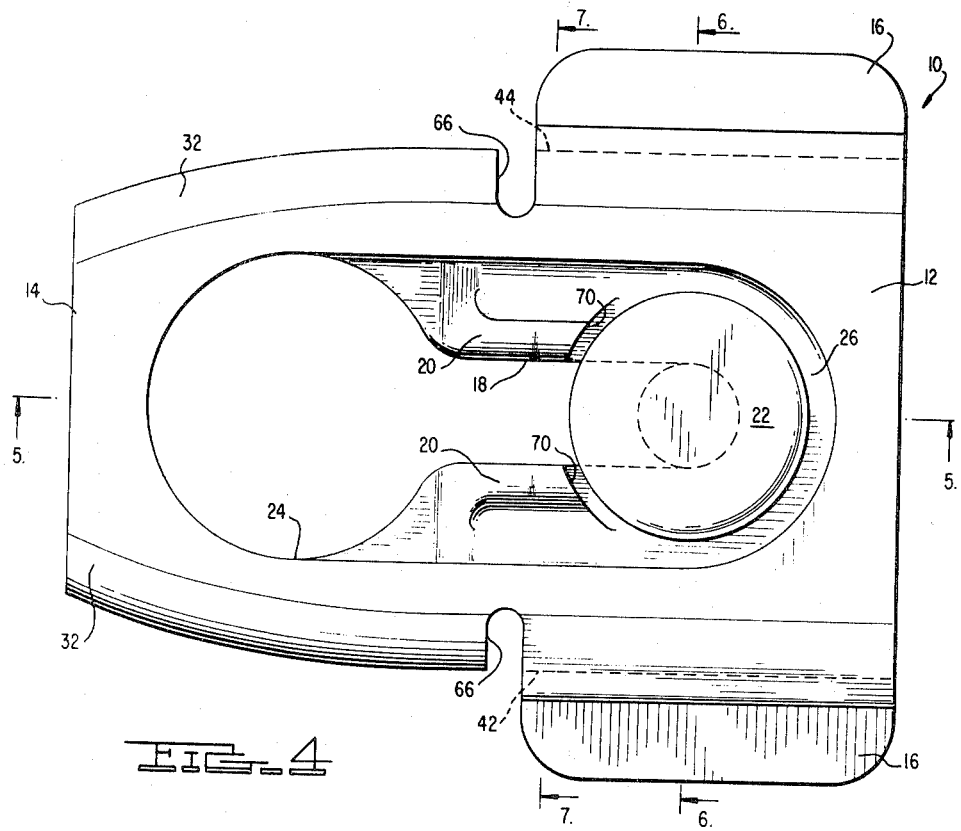
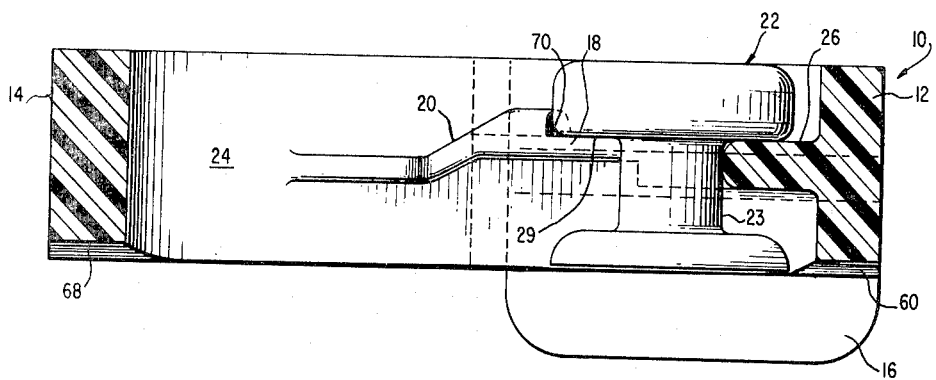
INVENTOR.
ENGELBERT A. MEYER
BY *Burton + Parker*
ATTORNEYS March 15, 1966
E. A. MEYER
3,239,988
AUTOMOBILE TRIM ASSEMBLY
Filed Jan. 15, 1964
4 Sheets-Sheet 3
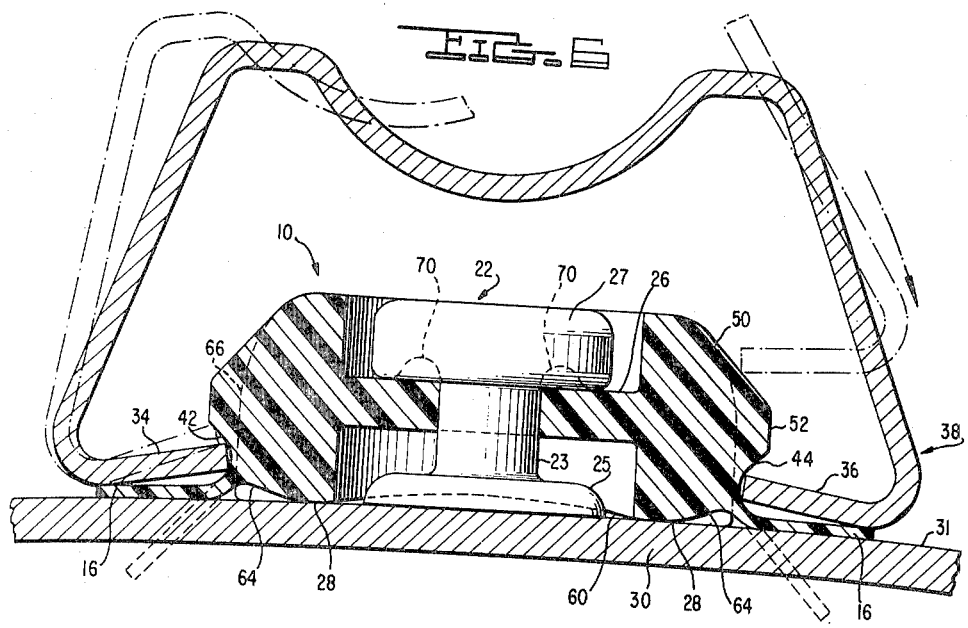
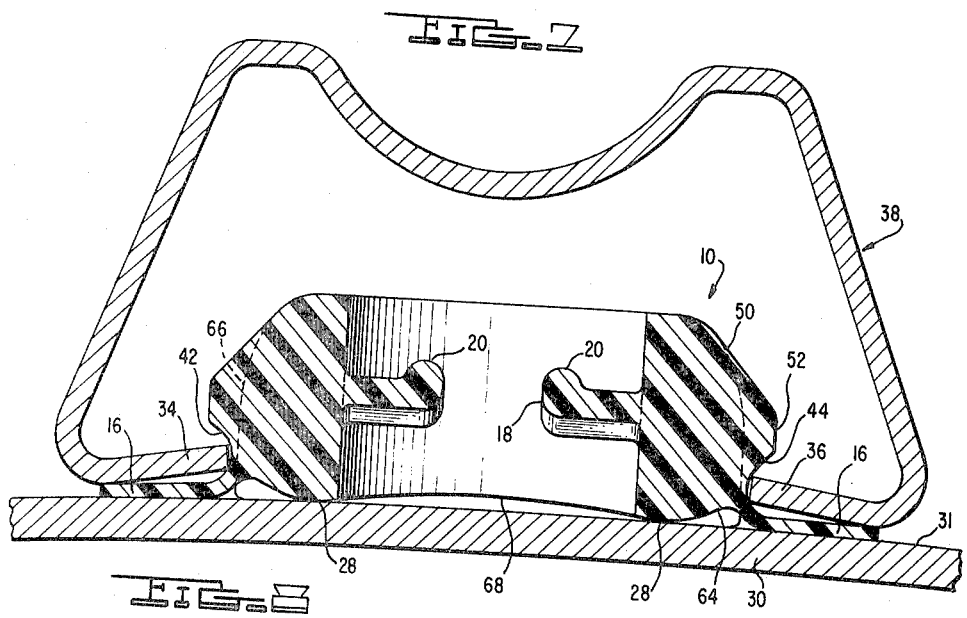
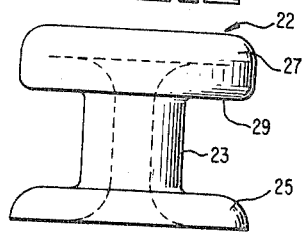
INVENTOR.
ENGELBERT A. MEYER
BY *Burton & Parker*
ATTORNEYS

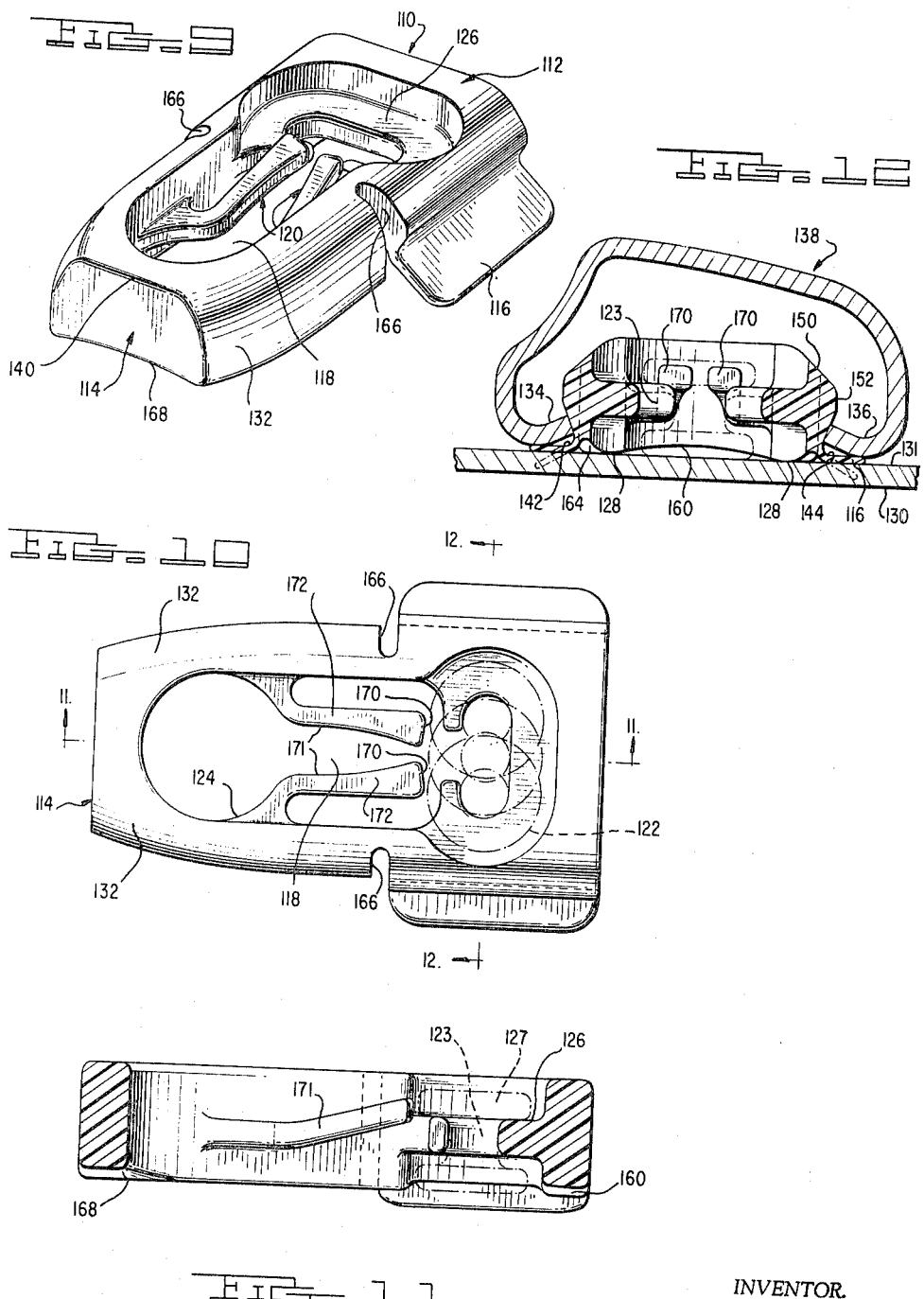

United States Patent Office 3,239,988
Patented Mar. 15, 1966

3,239,988
AUTOMOBILE TRIM ASSEMBLY
Engelbert A. Meyer, Union Lake, Mich., assignor to Chicago United Products Company, Inc., Detroit, Mich., a corporation of Michigan
Filed Jan. 15, 1964, Ser. No. 337,859
13 Claims. (Cl. 52—718)

This application is a continuation-in-part of my application Serial No. 297,413, filed July 24, 1963, now abandoned.

This invention relates to an improved molding assembly. More particularly, this invention relates to a molding assembly having an adapter which serves to interconnect a molding device with a button extending from the support.

Molding devices are used in the manufacture of automobiles, refrigerators and the like to meet functional and design requirements.

Preferably the button is attached to the support in accordance with the invention shown in the co-pending application of the assignee of the instant application, Serial No. 179,128, now Patent No. 3,153,468, wherein the button is welded to steel or adhesively secured to various materials including steel, thereby eliminating the corrosion problem inherent in previously used techniques requiring a hole through the support. A series of spaced buttons for a single longitudinal molding device may be applied in a gang operation with accurate alignment.

The button is small; in fact, somewhat miniature in size in comparison to previously employed fasteners in the automobile trim field. A suitable size presently used in automobile manufacture involves a button .200 inch in diameter at its head and .160 inch high, the shank of the button being less than one half the diameter of the head. Utiliztaion of this new concept of trim attachment in the automobile field provides substantial economies and advantages in the manufacturing and warehousing of doors, fenders and the like. Similar economies and advantages are attainable in many other fields, such as home appliances, refrigerators, stoves and the like. Business and electronic equipment offer other areas of commercial development.

The instant invention will be discussed in the context of an automobile molding device assembly.

An adapter is provided which may be applied in assembly line operation to a previously attached button on the automobile component such as a door, this component and button having been processed through finishing and painting operations.

On the assembly line, the adapter is connected to a button by a keyhole slot arrangement, the body of the adapter coacting with the button to produce a frictional seating of the adapter on the automobile component in an an approximate final alignment for acceptance of a flanged molding device, the opposed inturned flanges of which are snapped over the adapter to lock the molding device on the automobile support.

The adapter need not be accurately aligned prior to the application of the molding device. A pilot is provided on the adapter which is engaged by the inturned flanges of the molding device, thereby camming the adapter into final aligned position. The pilot of the adapter can be formed to correct a misalignment of about 45 degrees, the mere pressing application of the molding device causing the desired predetermined final alignment of the adapter for final locking of the molding device thereto. Laterally extending non-metallic fins are employed to provide insulation against electrolytic corrosion of the metal parts, the fins being sandwiched between the molding device and the surface of the automobile support.

Other objects, advantages and meritorious features will more fully appear from the following specifications, claims and accompanying drawings wherein:

FIG. 1 is a prespective view of the top of the adapter;
FIG. 2 is a perspective view of the bottom of the adapter;
FIG. 3 is a somewhat schematic side view showing a portion of an automobile panel with an adapter hanging freely on the left and an adapter wedged into an approximate final position on the right;
FIG. 4 is a top plan view of the adapter (a free unconnected button is shown in seated position);
FIG. 5 is a cross sectional view taken on line 5—5 of FIG. 4;
FIG. 6 is a cross sectional view taken on line 6—6 of FIG. 4 with the button connected (welded) to a support and a molding device snapped in place; the adapter's fins and the molding device are additional shown in dotted lines in free unstressed positions;
FIG. 7 is a cross sectional view similar to FIG. 6, but taken on line 7—7 of FIG. 4;
FIG. 8 is a side view of a button made on an eyelet machine;
FIG. 9 is a perspective view of the top of a spring finger adapter;
FIG. 10 is a top plan view of the spring finger adapter (a free unconnected button is shown in phantom in three positions of adjustment);
FIG. 11 is a cross sectinoal view taken on line 11—11 of FIG. 10; and
FIG. 12 is a cross sectional view taken on line 12—12 of FIG. 10, with the button shown in phantom connected to a support and molding device snapped in place; the adapter's fins are additionally shown in dotted lines in free unstressed positions.

Referring now to FIGS. 1–5, it will be seen that the adapter 10 includes a body 12 and a longitudinally aligned pilot 14 with lateral fins 16 extending downwardly at an angle from the bottom of the body. The body 12 has a longitudinal slot 18 on the sides of which are runners 20 which provide complementary cams for the button 22. An enlarged opening 24 is provided in the pilot 14 which connects with the body slot 18 to form a keyhole slot, the enlarged opening as seen in FIG. 3 being of sufficient size to receive the head of the button 22. The adapter 10 if allowed to remain in this condition would swing through gravity to the position shown on the left side of FIG. 3. On installation of the adapter, however, it is approximately aligned and slid forward to the position shown on the right side of FIG. 3, whereby the shank 23 (FIG. 5) of the button 22 is within the body slot 18 and the head of the button is seated in the button seat 26 of the body. The adapter, on being moved to final seated position, is biased inwardly by complementary cams on the button surface 29 and runners 20. When in final position, a frictional face-to-face engagement of the longitudinal bases 28 with the support 30 is produced which maintains the adapter in a fixed position on the support. The fins 16 are also placed in a biased condition by this movement and aid in the maintenance of the adapter in an approximate aligned condition, the fins 16 being swung to a flattened condition substantially coplanar with the bases 28.

The adapter need not be accurately positioned in a final aligned condition. However, in some situations, final alignment may be desirable in which case the adapter can be so aligned and reliance placed of the frictional mounting to maintain the alignment of a single or a plurality of adapters.

The pilot 14 extends longitudinally forwardly from the body 12 of the adapter and provides dome-like camming surfaces 32 extending downwardly from its narrow top which the inturned flanges 34, 36 (FIG. 6.) of the molding device 38 engage upon inward attaching movement, thereby causing an orienting turning or rotation of the adapter around the button into the required alignment. It will be noted that the dome-like camming surfaces 32 on the outer side walls of the pilot converge to a nose 40 at the forward end of the pilot, this convergence enabling the flanges 34 and 36 to swing the adapter to the required aligned position.

As the adapter is moved toward final position, flange 34 seats itself firmly in groove 42 (FIG. 6.) and establishes the final alignment of the adapter. The molding piece 38 is then in about the position shown in dotted lines in FIG. 6. It will be noted in FIG. 4 that the rearward and widest portions of the camming surfaces 32 are in substantial alignment with the grooves 42 and 44 shown in dotted lines; this aids in the alignment of the adapter since the flange 34 will be guided thereby into groove 42.

As seen in FIGS. 6, 7 and 8 the molding assembly includes the automobile metal panel support 30 which has an outer surface 31 to which is attached, as by welding, a headed button 22 having a shank 23 with an enlarged bottom 25 welded to the surface 31, and a head 27 having at its inner surface a cam surface 29 which coacts with and complements the runners 20 of the adapter and which engages the button seat 26.

The molding device 38 is a longitudinally extending hollow device having opposed inturned longitudinal inner flanges 34 and 36. On installation, one of the flanges 34 is moved into the longitudinal groove 42 on one side of the body 12 as discussed above and the other inturned flange 36 is then pressed against the tapered slide 50 of the body to expand the molding device, after which flange 36 moves past vertical side wall 52 and springs into groove 44. It will be noted that non-metallic fins 16 extend laterally of the body 12 adajacent the inner or bottom portion of the grooves 42 and 44 and upon application of the molding device serve as insulation against electrolytic corrosion between the device and the support, the fins 16 being sandwiched therebetween as shown in FIG. 6. This arrangement spaces the molding device from the automobile support thereby allowing air circulation under the molding device in the portions between adapters to evaporate moisture and inhibit corrosion difficulties.

Critical manufacturing and assembly tolerances are met by the body design. The adapter has a concave inner surface 60 (FIG. 6) and is equipped with spaced longitudinal bases 28, 28, one on each side of the slot, which engage the automobile support, the adapter being relieved by channels 64, 64, at the juncture of the fins 16 with the body 12 to eliminate any effect of their biased condition on the maintenance of the bases 28, 28 in face-to-face dimension controlling contact with the automobile support 30. Top-to-bottom transverse cut-out portions 66, 66 (FIG. 3) between the body 12 and the pilot 14 are also provided for this purpose, it being recognized that the inner bottom concave face 68 of the pilot also aids in establishing the required dimensional stability of the assembly.

The runners 20, 20 are located at each side of the forward portion of the slot 18 in the body 12, the runners providing rearwardly outwardly tapering camming surfaces which extend longitudinally rearwardly of the body. At the rearward ends of the runners, outwardly extending stops 70, 70 (FIG. 1 and FIG. 6 in dotted lines) are provided which define the forward end of the button seat. The stops 70, 70, in FIG. 4 being shown slightly forward of the button head to emphasize a slight clearance to insure full seating of the button on seat 26.

While various materials may be used for all parts, the automobile industry utilizes metal primarily for the automobile support and for the molding device. Steel is primarily used for the automobile support with stainless steel being used for the button as well as with cold rolled zinc-plated steel. The buttons are stud welded to a prefabricated automobile support, before painting, or at least before final finishing, in a predetermined orientation. After cleaning, coating and polishing the automobile support is ready to receive the adapter. Preferably the adapter is made of non-metallic resilient material to provide an electrolytic corrosion insulator between the non-similar metal parts, suitable plastics being Celcom, Delrin, nylon, etc. either fibre filled or not as desired.

The molding device is made of stock about .025 inch thick with a height of about .410 inch. The tapered slide or ramp 50 on the body 12 is preferably about .025 inch to about .030 inch long ending at a blunt wall 52 instead of a point, to prevent pealing, following by an inner or retaining slide surface forming the outer wall of groove 44 which induces the inturned flange 36 into final seated condition. The fins are about .010 inch and extend approximately 45 degrees from the bases 28, 28 of the body when free. Upon installation of the adapter on the button, the button seat may be drawn inwardly a significant amount of about .005 inch depending upon variations in manufacturing tolerances which tend to flatten somewhat the concave inner surface 60 of the body. As mentioned the concave inner surface 60 provides control of dimensional requirements and prevents a rocking situation which might possibly develop if a convex attitude were allowed.

Referring to FIGS. 6 and 8, it will be noted that the button 22 when seated engages the adapter 10 in two respects, one being a substantially horizontal seating engagement of the inner or bottom button surface 29 with the outer or top button seat 26 and the other being the substantially vertical frictional engagement of the button shank 23 with the substantially vertical sidewalls of the slot 18 in the adapter. Frictional forces at these areas of engagement maintain the adapter in its seated position. Stops 70, 70 are positioned to engage button 22 are specifically button head 27 and thereby limit the area of movement and effectively lock the button in its seat.

The specific button described hereinabove in terms of dimensions has a shank 23 which is 0.08 inch in diameter designed to be frictionally engaged by and received in adapter slot 18 which has a width of 0.08 inch, the same as the shank diameter. As mentioned, the adapted is preferably made of plastic; another plastic being ultra-violet stabilized-polypropylene. The plastic material provides a resilient biased clamping frictional engagement of the adapter 22 on the button's shank 23, this condition being developed along the entire length of the slot 18 as relative movement is imparted to the parts.

A preferred modification is shown in FIGS. 9–12, numerals of the 100-series being used to correlate FIGS. 1–8 therewith where appropriate. All of the description hereinabove is applicable to FIGS. 9–12 with appropriate correlations being made to select the pertinent figures. It will be noted, for example, that adapter 10 of FIG. 1 becomes adapter 110 of FIG. 9 in the preferred embodiment; similarly FIG. 4 is correlated with FIG. 10; FIG. 5 is correlated with FIG. 11; and FIG. 7 is correlated with FIG. 12.

Referring now to the preferred embodiment of FIGS. 9–12 it will be seen that runners 120 are provided by spring fingers which laterally or transversely converge toward each other as they extend longitudinally toward the button seat 126. The spring fingers 120 also extend outwardly or upwardly as they extend longitudinally toward the button seat 126.

As the adapter is slid onto the button, the shank of the button is engaged by the inner opposed vertical walls 171, 171 of the spring fingers 120 and the lower surface of the button head is engaged by the upper surfaces 172, 172 of the spring fingers, thereby distorting the spring fingers within their elastic limits transversely or laterally outwardly to allow passage of the button shank. The spring fingers are similarly distorted downwardly to allow passage of the button head. When the adapted has been slid sufficiently to seat the button head on the button seat 126, the spring fingers spring back to their normal unstressed condition and lock the adapted on the button; it will be noted in FIG. 12 the lock surfaces 170, 170 at the terminal ends of the spring fingers spring back to a normal unstressed position in alignment with the button head to insure anchoring of the adapter on the button.

Each spring finger 120 is attached at its inner forward end to the body 112 from which it extends freely rearwardly and upwardly forming one side of slot 118, each spring finger 120 of the preferred embodiment and each runner 20 of the first described embodiment providing resilient distortable portions adjacent slot 118 and 18 respectively to enable locking action with the button.

It will be noted that slot 118 is transversely enlarged at the button seat 126 to enable transverse alignment of the adapter either prior or during trim application.

Preferably the spring finger adapter is formed from a plastic material of the character heretofore mentioned, which may or may not be fibre filled as required.

The adapters may be fabricated by molding, the spring fingers being integral with the body and formed of the same material as the body.

What I claim is:

1. A molding assembly comprising a hollow molding device, a support, and an adapter interconnecting the molding device to the support,
   said support having a button attached to the surface of said support and extending outwardly therefrom,
   said adapter having a slot therein receiving said button and a button seat at the rearward end of said slot seating said adapter on said button under conditions of stress establishing a frictional face-to-face contact of said adapter with the support surface, and
   cooperating attaching means on said adapter and said molding device mounting said molding device on said support.

2. A molding assembly comprising a longitudinally extending hollow molding device having oppositely inturned longitudinal inner flanges, an automobile metal panel support having an outer surface with more than one headed button having its shank welded to said surface, the head of each button having an inwardly facing button surface substantially parallel to the support outer surface; and non-corrosive adapters interconnecting said molding device to the buttons, each including a body having a longitudinal slot therein,
   a pair of rearwardly outwardly tapered runners located at each side of the forward portion of said slot, the body at the rearward portion of the said slot forming a button seat, said runners having outwardly facing surfaces which form complementary runner cams for said button surface,
   a pilot integral with and extending forwardly and longitudinally from said body and having an enlarged opening therein which connects with the body slot to form a keyhole slot,
   the pilot enlarged opening receiving the button head therethrough and the body slot enabling sliding movement of said adapter along said shank to produce a wedge seating of said button on said button seat,
   outwardly extending stops at the rearward ends of said runners adjacent said button seat,
   the inner surface of the adapter being longitudinally concave and having longitudinal bases on each side of said body slot in face-to-face frictional contact with said support,
   fins extending laterally from said body adjacent said adapter inner surface and being in an inwardly biased condition in face-to-face frictional engagement with said support, the juncture between said fins and body being relieved to insure full controlling contact of said bases with said support,
   said body having longitudinal grooves in its sides adjacent said fins which house the ends of the inner flanges of said molding device, the fins being sandwiched between the flanges and the support, the body sides being tapered to provide a slide for an edge of a flange to enable assembly of the molding device,
   said pilot having dome-like curved and tapered side walls to enable final alignment of the adapter by the molding device upon attachment thereof to the adapter.

3. A molding assembly as defined in claim 2 wherein said runners each include a spring finger attached at its inner forward end to said body and extending freely rearwardly and outwardly, the slot between the rearward ends of the spring fingers being narrower than the shank of said button, said spring fingers being distorted when the shank passes.

4. An adapter for attaching a hollow molding device having oppositely inturned longitudinal inner flanges to a support which has an outer surface with a headed button having its shank attached to and extending from said surface, comprising, a body having a longitudinal slot therein open at the forward end for receiving the head of said button and a button seat at the rearward end of said slot for seating said body beneath said button head,
   said body having a longitudinally concave inner surface providing longitudinal bases on each side of said slot,
   a pair of rearwardly outwardly tapered runners located at each side of the forward portion of said slot for camming coaction with said headed button to develop an inward biased condition in said adapter to place said bases in frictional face-to-face engagement with said support, the ends of said runners terminate outwardly and forwardly of said button seat, said ends adapted to lock said button in said seat, said body having longitudinal grooves in its sides adapted to receive said inner flanges of said molding device, one of said sides providing a slide for engaging a flange to transversely expand said molding device prior to the flange's movement into its groove.

5. An adapter as characterized in claim 4 and including a pilot integral with and extending forwardly and longitudinally from said body and having an enlarged opening therein which connects with the body slot to form a keyhole slot, the pilot enlarged opening being adapted to receive the button head therethrough and the body slot enabling sliding movement of said adapter along said button shank to produce a wedge seating of said button on said button seat, said pilot having dome-like curved and tapered side walls to enable final alignment of the adapter by the molding device upon attachment thereof to the adapter.

6. An adapter as defined in claim 4 and wherein the slot at said button seat is transversely enlarged to facilitate adjusting movement of said adapter.

7. An adapter for enabling the attachment of a hollow molding device to a support panel from which extends a headed button the shank of which is attached to and extends from the surface of the support panel comprising a body having a slot therein for receiving said button and a button seat at the rearward end of said slot for seating said button, said button seat being adapted to coact with said button to establish a frictional face-to-face contact of the body with the support surface, means on said adapter for receiving and holding said molding device on said adapter, said body having a rearwardly and upwardly extending spring finger for camming engagement with said button located at and defining a side of said slot, said spring finger including means for maintaining the button in the seat, said spring finger adapted to be cammed to a distorted position by said button to allow passage of said button to said button seat beyond said last-mentioned means, said spring finger when free of the distorting camming action of said button springing back to dispose said last-mentioned means in a lock position in alignment with the button to prevent unlocking movement of the body and the button.

8. An adapter as defined in claim 7 and wherein said spring finger is attached at its inner forward end to said body and extends freely rearwardly and upwardly.

9. An adapter as defined in claim 7 and wherein the slot at said button seat is transversely enlarged to facilitate adjusting movement of said adapter.

10. The invention as defined in claim 7 characterized in that there are a pair of said spring fingers located at and defining opposite sides of said slot.

11. An adapter as defined in claim 7 and wherein said spring finger is attached at its inner forward end to said body and extending freely rearwardly and upwardly and forms one side of said slot, said slot having a portion narrower than the shank of said button, said spring finger being distorted to widen the slot as the shank passes.

12. An adapter as defined in claim 11 and wherein said body has a pilot comprising a pair of outer side surfaces engageable by said molding device to swing said body about said button into interconnecting alignment with said molding device to facilitate assembly.

13. An adapter for enabling the attachment of a hollow molding device having oppositely inturned longitudinal inner flanges to an automobile panel having an outer surface from which extends a plurality of headed buttons the shanks of which are welded to said surface with the head of each button having an inwardly facing button surface substantially parallel to the automobile panel surface, comprising: a body of non-corrosive resilient material having a longitudinal slot therein, a pair of rearwardly outwardly tapered runners located at each side of the forward portion of said slot, the body at the rearward portion of the said slot forming a button seat, said runners having outwardly facing surfaces which form complementary runner cams for said button surface, a pilot integral with and extending forwardly and longitudinally from said body and having an enlarged opening therein which connects with the body slot to form a keyhole slot, the pilot enlarged opening receiving the button head therethrough and the body slot enabling sliding movement of said adapter along said shank to produce a wedged seating of said button or said button seat, outwardly extending stops at the rearward ends of said runners adjacent said button seat, the inner surface of the adapter being longitudinally concave and having longitudinal bases on each side of said body slot in face-to-face frictional contact with said support, fins extending laterally from said body adjacent said adapter inner surface and being in an inwardly biased condition in face-to-face frictional engagement with said support, the juncture between said fins and body being relieved to insure full controlling contact of said bases with said support, said body having longitudinal grooves in its sides adjacent said fins which house the ends of the inner flanges of said molding device, the fins being sandwiched between the flanges and the support, the body sides being tapered to provide a slide for an edge of a flange to enable assembly of the molding device, said pilot having dome-like curved and tapered side walls to enable final alignment of the adapter by the molding device upon attachment thereof to the adapter.

References Cited by the Examiner
UNITED STATES PATENTS

| | | | |
|---|---|---|---|
| 2,358,206 | 9/1944 | Boersma | 85—5 X |
| 2,358,837 | 9/1944 | Tinnerman | 85—5 X |
| 2,650,657 | 9/1953 | Ohlsson | 5—299 X |
| 3,127,965 | 4/1964 | Weisenberger | 52—718 |
| 3,146,502 | 9/1964 | Reiss et al. | 20—56.4 X |

FRANK L. ABBOTT, *Primary Examiner.*

RICHARD W. COOKE, JR., *Examiner.*